US010536216B1

(12) United States Patent
Chhillar et al.

(10) Patent No.: US 10,536,216 B1
(45) Date of Patent: Jan. 14, 2020

(54) SERVICE SYNCHRONIZATION IN RETAIN HOME PATH SCENARIOS IN A CONTROL PLANE NETWORK (71) Applicant: Ciena Corporation, Hanover, MD (US)

(72) Inventors: Mohit Chhillar, Delhi (IN); Anurag Prakash, Ottawa (CA); Seemant Bisht, New Delhi (IN); Rishi Malik, New Delhi (IN)

(73) Assignee: Ciena Corporation, Hanover, MD (US)

( * ) Notice: Subject to any disclaimer, the term of this patent is extended or adjusted under 35 U.S.C. 154(b) by 16 days.

(21) Appl. No.: 16/125,862

(22) Filed: Sep. 10, 2018

(30) Foreign Application Priority Data

Jul. 24, 2018 (IN) .............................. 201811027760

(51) Int. Cl.
H04B 10/032 (2013.01)
H04J 14/08 (2006.01)
H04L 12/24 (2006.01)

(52) U.S. Cl.
CPC .......... *H04B 10/032* (2013.01); *H04J 14/083* (2013.01); *H04L 41/0631* (2013.01); *H04J 2203/006* (2013.01)

(58) Field of Classification Search
CPC .............................. H04B 10/032; H04J 14/083; H04J 2203/006; H04L 41/0631
See application file for complete search history.

(56) References Cited

U.S. PATENT DOCUMENTS

| 7,209,434 | B2 * | 4/2007 | Kano | ...................... H04L 45/00 370/216 |
| 7,965,938 | B2 * | 6/2011 | Xu | ...................... H04J 14/0227 398/12 |
| 9,391,704 | B2 * | 7/2016 | Gerstel | ................. H04L 45/125 |
| 2010/0309777 | A1 * | 12/2010 | Kano | ....................... H04J 3/14 370/218 |
| 2012/0163803 | A1 * | 6/2012 | Zi | .............................. H04J 3/14 398/17 |
| 2014/0186020 | A1 * | 7/2014 | Handelman | ......... H04J 14/0268 398/2 |
| 2016/0020850 | A1 * | 1/2016 | Youn | .................... H04B 10/032 398/5 |

* cited by examiner

*Primary Examiner* — Mina M Shalaby
(74) *Attorney, Agent, or Firm* — Clements Bernard PLLC; Christopher L. Bernard; Lawrence A. Baratta, Jr.

(57) ABSTRACT

A service modification method includes, in a node which is part of a network controlled by a control plane, routing a connection off of its home path to a current path which is at least partially disjoint from the home path and creating a reservation for the connection on the home path such that the connection can revert thereto; signaling a modification of the connection while it is on the current path; and updating the reservation based on the modification including signaling the modification to all nodes on the home path. The service modification method can further include reverting the connection to the home path with the modification. The updating can fail due to an inability to support the modification on the home path, and the service modification method can further include periodically retrying the updating the reservation based on the modification.

20 Claims, 6 Drawing Sheets

201 — IN A NODE WHICH IS PART OF A NETWORK CONTROLLED BY A CONTROL PLANE, ROUTING A CONNECTION OFF OF ITS HOME PATH TO A CURRENT PATH WHICH IS AT LEAST PARTIALLY DISJOINT FROM THE HOME PATH AND CREATING A RESERVATION FOR THE CONNECTION ON THE HOME PATH SUCH THAT THE CONNECTION CAN REVERT THERETO

202 — SIGNALING A MODIFICATION OF THE CONNECTION WHILE IT IS ON THE CURRENT PATH

203 — UPDATING THE RESERVATION BASED ON THE MODIFICATION COMPRISING SIGNALING THE MODIFICATION TO ALL NODES ON THE HOME PATH

204 — REVERTING THE CONNECTION TO THE HOME PATH WITH THE MODIFICATION

205 — WHEREIN THE UPDATING FAILS DUE TO AN INABILITY TO SUPPORT THE MODIFICATION ON THE HOME PATH, AND PERIODICALLY RETRYING THE UPDATING THE RESERVATION BASED ON THE MODIFICATION

206 — WHEREIN THE MODIFICATION ON THE CURRENT PATH CHANGES CURRENT SPECTRUM, AND THE CURRENT SPECTRUM IS UNAVAILABLE ON THE HOME PATH, AND RE-SIGNALING ON THE HOME PATH FOR DIFFERENT SPECTRUM FOR THE RESERVATION SUCH THAT THE CONNECTION CAN RETUNE DURING REVERSION

207 — WHEREIN THE MODIFICATION ON THE CURRENT PATH CHANGES CURRENT SPECTRUM, AND THE CURRENT SPECTRUM IS UNAVAILABLE ON THE HOME PATH, AND SIGNALING ON THE HOME PATH FOR DIFFERENT SPECTRUM FOR THE RESERVATION SUCH THAT THE CONNECTION IS RETUNED DURING REVERSION

SERVICE SYNCHRONIZATION IN RETAIN HOME PATH SCENARIOS IN A CONTROL PLANE NETWORK

FIELD OF THE DISCLOSURE

The present disclosure generally relates to control plane networks. More particularly, the present disclosure relates to systems and methods for service synchronization in Retain Home Path (RHP) scenarios in a control plane network.

BACKGROUND OF THE DISCLOSURE

Optical (i.e., transport) networks and the like (e.g., Dense Wavelength Division Multiplexed (DWDM), Optical Transport Network (OTN), Ethernet, and the like) at various layers are deploying control plane systems and methods. Control planes provide automatic allocation and management of network resources (e.g., Layer 0, Layer 1, etc. resources) in an end-to-end manner. Example control planes may include Automatically Switched Optical Network (ASON) as defined in ITU-T G.8080/Y.1304, Architecture for the automatically switched optical network (ASON) (February 2005), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to Private Network-to-Network Interface (PNNI) and MPLS; or any other type control plane for controlling network elements at multiple layers, and establishing connections therebetween. Control planes are configured to establish end-to-end signaled connections such as Subnetwork Connections (SNCs) in ASON or OSRP, and Label Switched Paths (LSPs) in GMPLS and MPLS. Control planes are configured to compute paths, to route/signal the SNCs/LSPs, and program the underlying hardware accordingly.

Retain Home Path (RHP) is a feature in a control plane related to restoring a connection and is described, for example, in commonly assigned U.S. Pat. No. 9,088,486, issued on Jul. 21, 2015, and entitled "Retention of a subnetwork connection home path," the contents of which are incorporated by reference herein. The RHP feature reserves the resources of a home path while a connection (e.g., SNC, LSP, etc.) (also, a connection can be referred to as a service) is not fully provisioned on all or part of the home path. The home path is defined as the original path and the connection can be off of the home path for a variety of reasons, e.g., protection, maintenance, etc. Thus, the RHP feature reserves resources on the home path to provide reliability and consistency, allowing a connection to revert when possible to the home path.

In the case of Layer 0 (L0) photonic and Layer 1 (L1) Time Division Multiplexing (TDM), the service characteristics can be modified "on the fly" such as for flex grid resizing at L0, Optical Data Unit flexible (ODUflex) resizing, or modification of other service characteristics. Disadvantageously, any modification while the connection is off of the home path can lead to a discrepancy between the current route and the reserved home path.

BRIEF SUMMARY OF THE DISCLOSURE

In an embodiment, a service modification method includes, in a node which is part of a network controlled by a control plane, routing a connection off of its home path to a current path which is at least partially disjoint from the home path and creating a reservation for the connection on the home path such that the connection can revert thereto; signaling a modification of the connection while it is on the current path; and updating the reservation based on the modification including signaling the modification to all nodes on the home path. The service modification method can further include reverting the connection to the home path with the modification. The updating can fail due to an inability to support the modification on the home path, and the method can further include periodically retrying the updating the reservation based on the modification. The connection is an optical connection utilizing flexible grid spectrum, and the modification can include expansion or contraction of the flexible grid spectrum. The updating the reservation can include signaling the expansion for either a left side or a right side of current spectrum. The modification on the current path can be on one of a left side or a right side of current spectrum, and the updating the reservation can be on the other one of the left side or the right side of the home path spectrum such that the connection can retune during reversion.

The modification on the current path can change current spectrum, and the current spectrum can be unavailable on the home path, and the method can further include re-signaling on the home path for different spectrum for the reservation such that the connection is retuned during reversion. The modification on the current path can change current spectrum, and the current spectrum or different can be unavailable on the home path to support the modification, and the method can further include raising an alarm and preventing reversion of the connection to the home path. The connection can be an optical connection utilizing flexible grid spectrum, wherein the modification can include expansion of the flexible grid spectrum, wherein the connection can utilize at least one regenerator port on the home port, and wherein the updating the reservation can include changing the at least one regenerator port. The modification can include changing service characteristics of the connection including one of restorability and service priority.

In another embodiment, a node includes a plurality of ports communicatively coupled to a network; a switch configured to switch data between the plurality of ports; and a controller communicatively coupled to the plurality of ports and the switch and configured to implement a control plane with other nodes in the network, wherein a connection is signaled by the controller on a home path, wherein the connection is signaled off of the home path to a current path which is at least partially disjoint from the home path and a reservation is created by the controller for the connection on the home path such that the connection can revert thereto, wherein the reservation is signaled to all nodes on the home path, wherein the controller signals a modification of the connection while it is on the current path, and the controller updates the reservation based on the modification. The controller can revert the connection to the home path with the modification. The updated reservation can fail due to an inability to support the modification on the home path, and wherein the controller can periodically retry to update the reservation based on the modification. The connection can be an optical connection utilizing flexible grid spectrum, and the modification can include expansion or contraction of the flexible grid spectrum. The modification can include changing service characteristics of the connection including one of restorability and service priority.

In a further embodiment, a network includes a plurality of nodes; a plurality of links interconnecting the plurality of nodes; and one or more controllers implementing a control plane for control of connections in the network; wherein a connection is signaled by on a home path, wherein the connection is signaled off of the home path to a current path which is at least partially disjoint from the home path and a reservation is created by the control plane for the connection on the home path such that the connection can revert thereto, wherein the reservation is signaled to all nodes on the home path, wherein the control plane signals a modification of the connection while it is on the current path, and the control plane updates the reservation based on the modification. The control plane can revert the connection to the home path with the modification. The updated reservation can fail due to an inability to support the modification on the home path, and wherein the controller can periodically retry to update the reservation based on the modification. The connection can be an optical connection utilizing flexible grid spectrum, and the modification can include expansion or contraction of the flexible grid spectrum. The modification can include changing service characteristics of the connection including one of restorability and service priority.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for service configuration synchronization in Retain Home Path (RHP) scenarios in a control plane network. With the advent of flex grid networks and the opening up of hardware interfaces, service characteristics can be changed, for example, for resizing. The systems and methods maintain effective resiliency by synchronizing changes on a current path with the home path. Again, the RHP feature is one where a reservation is maintained on a connection's home path when that connection is off of the home path. When a connection is on a current path (which is different from the home path, i.e., meaning the current path may have some or no links in common with the home path, but at least one link is different) and there is a service modification, the systems and methods synchronize the service modification by changing the reservation on the home path accordingly. In this manner, the connection can revert to the home path when applicable with the service modification included. Examples of the service modification can include L0 flex grid resizing, regenerator allocations, service characteristics (e.g., permanent to mesh restorable, service priority, etc.), and L1 OTN flex resizing.

Optical Network

Figure 1:
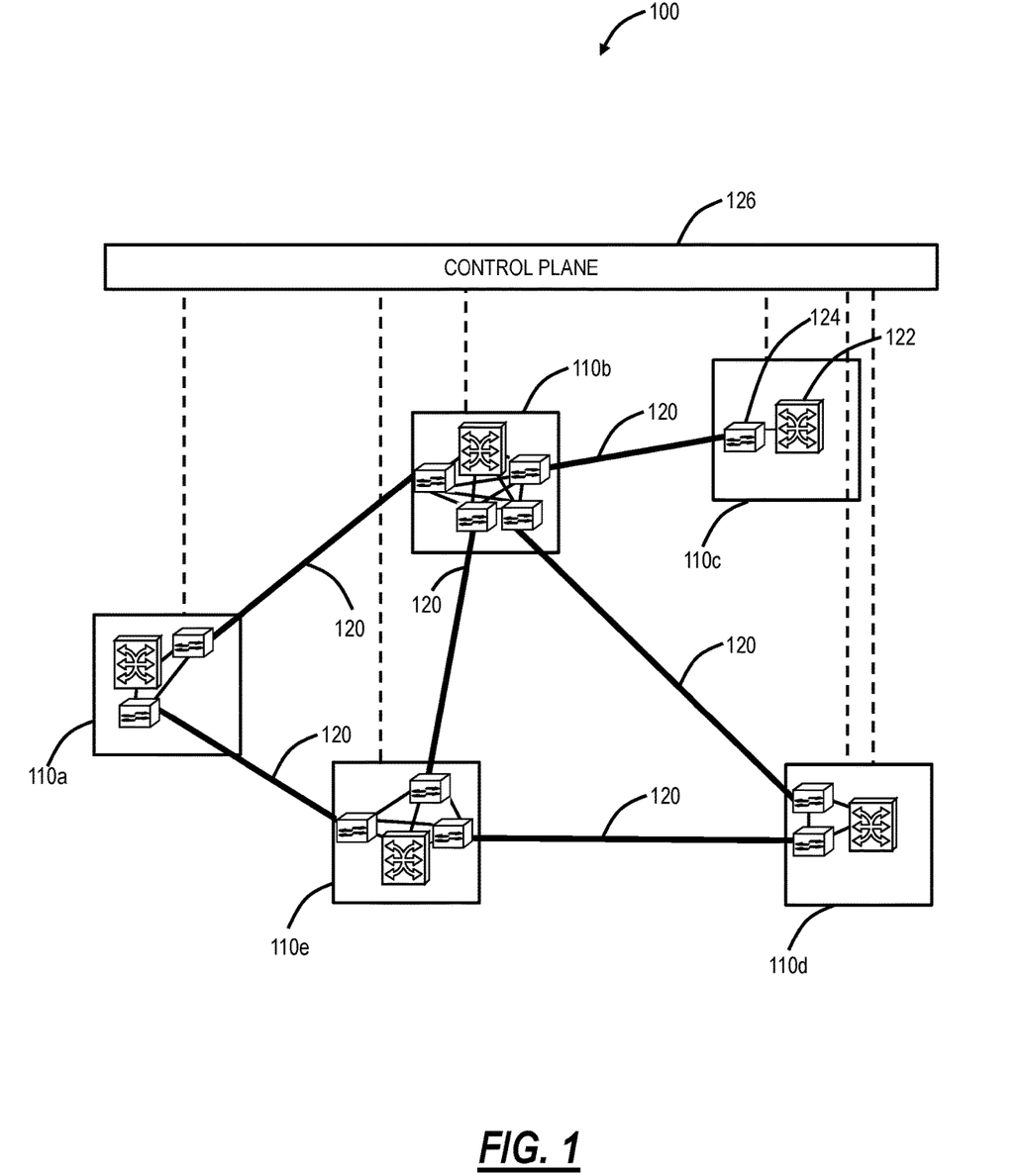
FIG. 1 is a network diagram of an example optical network with five interconnected sites.

FIG. 1 is a network diagram of an example optical network 100 with five interconnected sites 110a, 110b, 110c, 110d, 110e. The sites 110 are interconnected by a plurality of links 120. Each of the sites 110 can include a switch 122 and one or more Wavelength Division Multiplexing (WDM) network elements 124. The switch 122 can be configured to provide services at Layer 0 (DWDM, photonic), Layer 1 (e.g., Optical Transport Network (OTN)), and/or Layer 2 (e.g., Ethernet). The WDM network elements 124 provide the photonic layer (i.e., Layer 0) and various functionality associated therewith (e.g., multiplexing, amplification, optical routing, wavelength conversion/regeneration, local add/drop, etc.) including photonic control. Of note, while shown separately, those of ordinary skill in the art would understand the switch 122 and the WDM network elements 124 may be realized in the same network element or in multiple network elements. The photonic layer can also include intermediate amplifiers and/or regenerators on the links 120 which are omitted for illustration purposes. The optical network 100 is illustrated, for example, as an interconnected mesh network, and those of ordinary skill in the art will recognize the optical network 100 can include other architectures, with additional sites 110 or with fewer sites 110, with additional network elements and hardware, etc. The optical network 100 is presented herein as an example for implementing the path computation systems and methods.

The sites 110 communicate with one another over the links 120. The sites 110 can be network elements which include a plurality of ingress and egress ports forming the links 120. Further, the sites 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 includes a control plane 126 operating on and/or between the switches 122 and/or the WDM network elements 124 at the sites 110a, 110b, 110c, 110d, 110e. The control plane 126 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an embodiment, the control plane 126 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the optical network 100 and the control plane 126 can utilize any type control plane for controlling the switches 122 and/or the WDM network elements 124 and establishing connections.

Example Network Element/Node

Figure 2:
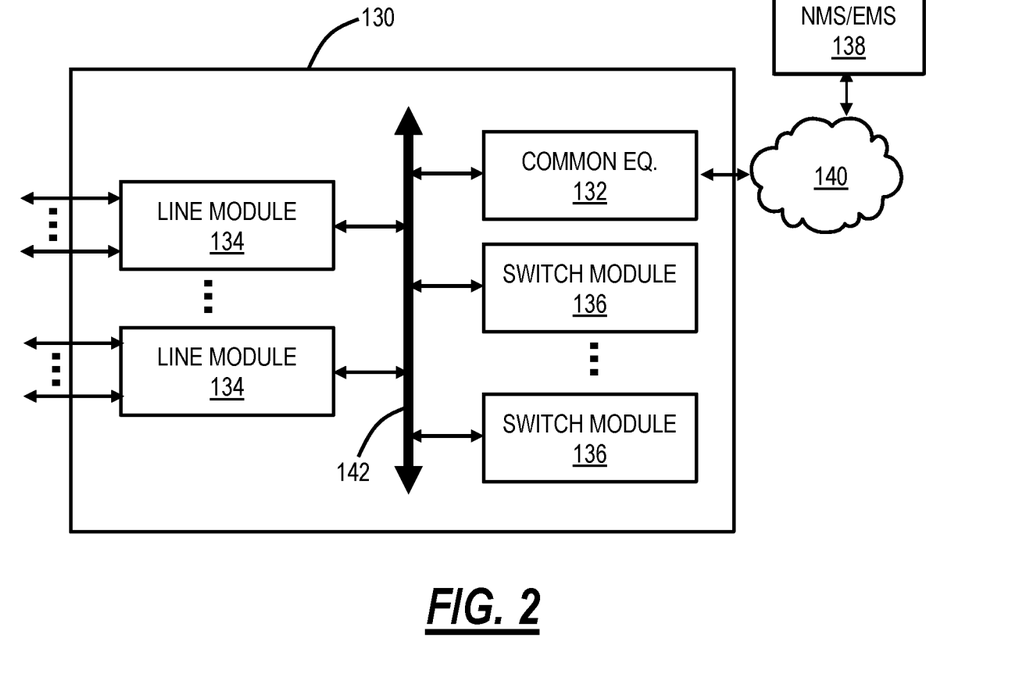
FIG. 2 is a block diagram of a node for use with the systems and methods described herein.

FIG. 2 is a block diagram of a node 130 for use with the systems and methods described herein. The node 130 can be the switch 122, the WDM network element 124, or the like. In an embodiment, the node 130 can be a network element that may consolidate the functionality of a Multi-Service Provisioning Platform (MSPP), Digital Cross-Connect (DCS), Ethernet and/or Optical Transport Network (OTN) switch, WDM/Dense WDM (DWDM) platform, Packet Optical Transport System (POTS), etc. into a single, high-capacity intelligent switching system providing Layer 0, 1, 2, and/or 3 consolidation. In another embodiment, the node 130 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM terminal, an access/aggregation device, etc. That is, the node 130 can be a system with ingress and egress digital signals and switching of channels, timeslots, tributary units, etc. Also, the node 130 can be a system with ingress and egress of optical signals and switching/routing of wavelengths. Of course, the node 130 can combine both digital signals and optical signals. While the node 130 is generally shown as an optical network element, the systems and methods contemplated for use with any switching fabric, network element, or control plane network based thereon.

The node 130 can include common equipment 132, one or more line modules 134, and one or more switch modules 136. The common equipment 132 can include power; a control module; Operations, Administration, Maintenance, and Provisioning (OAM&P) access; user interface ports; and the like. The common equipment 132 can connect to a management system 138 through a data communication network 140 (as well as a Path Computation Element (PCE), Software Defined Networking (SDN) controller, OpenFlow controller, etc.). The management system 138 can include a Network Management System (NMS), Element Management System (EMS), or the like. Additionally, the common equipment 132 can include a control plane processor, such as a controller 150 illustrated in FIG. 3 configured to operate the control plane as described herein. The node 130 can include an interface 142 for communicatively coupling the common equipment 132, the line modules 134, and the switch modules 136 to one another. For example, the interface 142 can be a backplane, midplane, a bus, optical or electrical connectors, or the like. The line modules 134 are configured to provide ingress and egress to the switch modules 136 and to external connections on the links to/from the node 130. In an embodiment, the line modules 134 can form ingress and egress switches with the switch modules 136 as center stage switches for a three-stage switch, e.g., a three-stage Clos switch. Other configurations and/or architectures are also contemplated.

The line modules 134 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, Flexible Ethernet, etc. Further, the line modules 134 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, 100 Gb/s, 200 Gb/s, N×1.25 Gb/s, and any rate in between as well as future higher rates. The line modules 134 can include wavelength division multiplexing interfaces, short reach interfaces, and the like, and can connect to other line modules 134 on remote network elements, end clients, edge routers, and the like, e.g., forming connections on the links in the network 100. From a logical perspective, the line modules 134 provide ingress and egress ports to the node 130, and each line module 134 can include one or more physical ports. The switch modules 136 are configured to switch channels, timeslots, tributary units, packets, etc. between the line modules 134. For example, the switch modules 136 can provide wavelength granularity (Layer 0 switching); OTN granularity; Ethernet granularity; and the like. Specifically, the switch modules 136 can include Time Division Multiplexed (TDM) (i.e., circuit switching) and/or packet switching engines. The switch modules 136 can include redundancy as well, such as 1:1, 1:N, etc.

Those of ordinary skill in the art will recognize the node 130 can include other components which are omitted for illustration purposes, and that the systems and methods described herein are contemplated for use with a plurality of different network elements with the node 130 presented as an example of a type of network element. For example, in another embodiment, the node 130 may not include the switch modules 136, but rather have the corresponding functionality in the line modules 134 (or some equivalent) in a distributed fashion. For the node 130, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 130 is merely presented as one example of node 130 for the systems and methods described herein.

Controller

Figure 3:
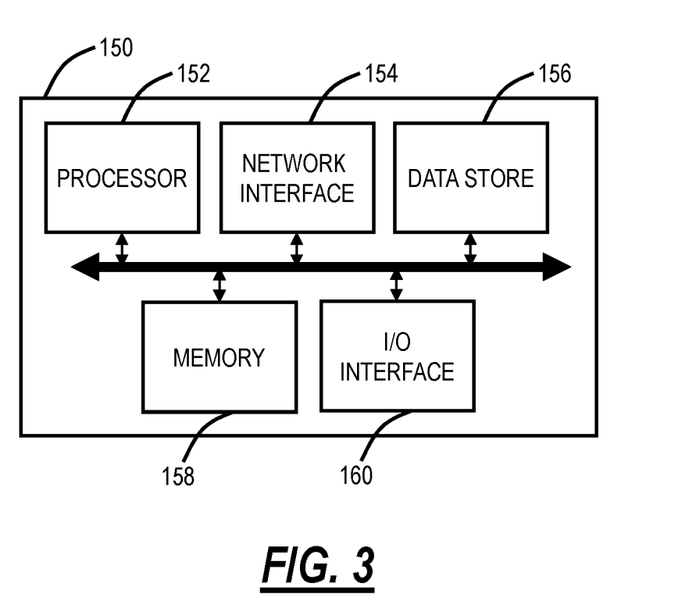
FIG. 3 is a block diagram of a controller to provide control plane processing and/or Operations, Administration, Maintenance, and Provisioning (OAM&P) for the node of FIG. 2.

FIG. 3 is a block diagram of a controller 150 to provide control plane processing and/or OAM&P for the node 130. The controller 150 can be part of the common equipment, such as common equipment 132 in the node 130, or a stand-alone device communicatively coupled to the node 130 via the DCN 140. The controller 150 can include a processor 152 which is a hardware device for executing software instructions such as operating the control plane. The processor 152 can be any custom made or commercially available processor, a central processing unit (CPU), an auxiliary processor among several processors associated with the controller 150, a semiconductor-based microprocessor (in the form of a microchip or chip set), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 140, such as to communicate control plane information to other controllers, to the management system 138, to the nodes 130, and the like. The network interface 154 can include address, control, and/or data connections to enable appropriate communications on the network 140. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices. Further, the I/O interface 160 includes components for the controller 150 to communicate with the other controllers/ nodes, such as using overhead associated with TDM signals.

The controller 150 can be configured to communicate with other controllers 150 in the network 100 to operate the control plane 126 and for control plane signaling. This communication may be either in-band or out-of-band. For SONET networks and similarly for SDH networks, the controllers 150 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an embodiment, the controllers 150 can include an in-band signaling mechanism utilizing OTN overhead. The General Communication Channels (GCC) defined by ITU-T Recommendation G.709 are in-band side channels used to carry transmission management and signaling information within Optical Transport Network elements. For example, the GCC may be used for in-band signaling or routing to carry control plane traffic. Based on the intermediate equipment's termination layer, different bytes may be used to carry control plane signaling. Other mechanisms are also contemplated for control plane signaling.

The controller 150 is configured to operate the control plane 126 in the network 100. That is, the controller 150 is configured to implement software, processes, algorithms, etc. that control configurable features of the network 100, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 150 can include a topology database that maintains the current topology of the network 100 based on control plane signaling (e.g., HELLO messages) and a connection database that maintains available bandwidth on the links 120 again based on the control plane signaling. The control plane 126 can be a distributed control plane; thus, a plurality of the controllers 150 can act together to operate the control plane 126 using the control plane signaling to maintain database synchronization. In source-based routing, the controller 150 at a source node 130 for a connection is responsible for path computation and establishing by signaling other controllers 150 in the network 100, such as through a SETUP message. For example, the source node 130 and its controller 150 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc.

Path computation generally includes determining a path, i.e., traversing the links 120 through the nodes 130 from the originating node 130 to the destination node 130 based on a plurality of constraints such as administrative weights on the links, bandwidth availability on the links 120, etc. Again, the home path is the original route for a connection (SNC, LSP, MPLS tunnel, etc.). In some manner, it is assumed the home path is the optimal route for the connection, e.g., lowest latency, lowest administrative weight, shortest distance, least bandwidth fragmentation, etc. In it also expected that a connection would typically be on the home path the majority of the time. However, there are scenarios where the connection is routed off of the home path by the control plane 126, e.g., for restoration, maintenance, preemption, etc. In this scenario, the RHP feature reserves and retains the connection's resources on the home path, preventing another connection from consuming the resources so that the connection can revert to the home path.

Service Modification

Again, the RHP feature reserves and retains the resources on the home path for a service to revert when available. Of note, when the service is away from the home path, the service can undergo service modification. The service modification can include L0 flex grid resizing, regenerator bank allocations, service characteristic modification, OTN flex resizing, and the like. As described herein, the service modification leads to a discrepancy between the current path and the RHP reservation on the home path.

At Layer 0 (optical, DWDM, etc.) and Layer 1 (TDM such as using Optical Transport Network (OTN)), various techniques are being introduced to support service resizing, dynamically in-service. Service resizing at Layer 0 can include resizing a Media Channel (MC) or Super Channel (SC) in a flexible grid deployment. As described herein, reference is made to the MC which is a group of contiguous spectrum between two nodes in the network which can transport one or more Network Media Carriers (NMC) without requiring dead bands or guard bands between the NMCs. Thus, MC deployments efficiently use the optical spectrum, i.e., no unused, wasted spectrum in the group of contiguous spectrum. For example, given an MC between a source and destination, there will be situations where new NMCs are needed or existing NMCs are removed from the MC where the MC size needs to be changed while in-service. L0 flex grid resizing includes expansion or contraction of the optical spectrum.

At Layer 1, service resizing can include resizing Optical Data Unit flexible (ODUflex) connections. Of note, in-service resizing techniques have been described such as ITU Recommendation G.7044/Y.1347 (October 2011) "Hitless adjustment of ODUflex(GFP)," the contents of which are incorporated herein by reference. L1 OTN flex resizing includes expansion or contraction of the size of an ODUflex. The regenerator bank allocation may change optical-electrical-optical (OEO) requirements based on L0 flex grid resizing or the like. The service characteristics modification can include, for example, changing service priority, changing protection requirements (e.g., 1+1, mesh, etc.), changing status (permanent, etc.).

Service Modification Process

Figure 4:
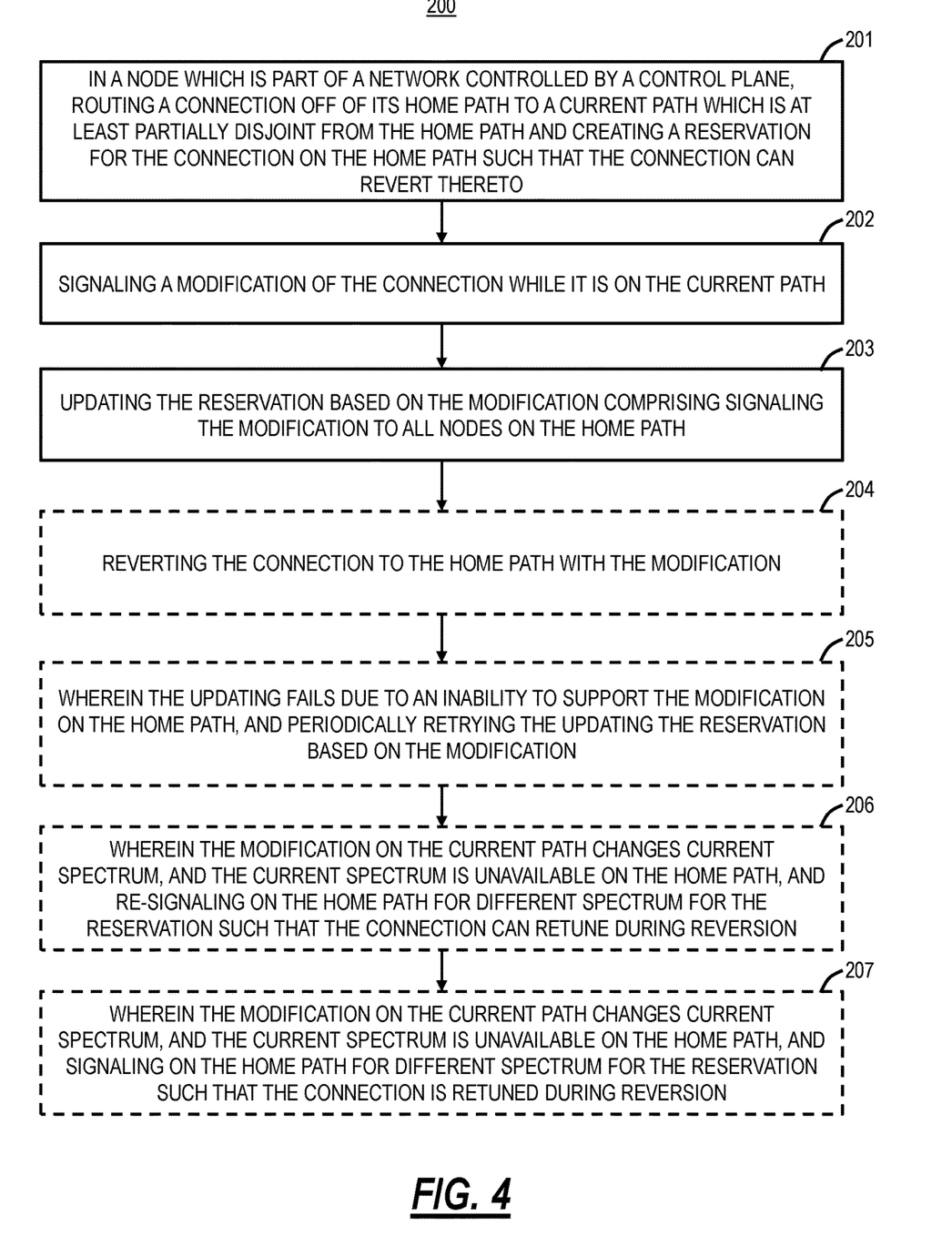
FIG. 4 is a flowchart of a service modification process.

FIG. 4 is a flowchart of a service modification process 200. The service modification process 200 can be performed by one of the switches 122, the WDM network elements 124, or the network element 130. In the control plane 126, a connection can be an SNC, LSP, etc. and can be controlled by a source node. The service modification process 200 can be implemented by a source node for the respective connection. The service modification process 200 includes, in a node which is part of a network controlled by a control plane, routing a connection off of its home path to a current path which is at least partially disjoint from the home path and creating a reservation for the connection on the home path such that the connection can revert thereto (step 201); signaling a modification of the connection while it is on the current path (step 202); and updating the reservation on the home path based on the modification including signaling the modification to all nodes on the home path (step 203).

The service modification process 200 can further include reverting the connection to the home path with the modification (step 204). Note, the connection can be off of the home path for a variety of reasons, e.g., protection, priority, maintenance, etc. and the expectation is for the connection to revert at some point, e.g., when a fault has cleared, when bandwidth is available, when maintenance is complete, etc. Generally, the home path is a desired path and the one the connection is on for the majority of the time.

The updating can fail due to an inability to support the modification on the home path, and the service modification process 200 can further include periodically retrying the updating the reservation based on the modification (step 205). Here, the node can periodically retry to determine if the modification can be supported and this can be every 30 sec., for example. The connection can be an optical connection utilizing flexible grid spectrum, and the modification includes expansion or contraction of the flexible grid spectrum. Of note, contraction of the flexible grid spectrum should be supported on the home path as this does not require additional resources, but rather reduces the resources.

The connection can be an optical connection utilizing flexible grid spectrum, and the modification can include expansion of the flexible grid spectrum. The updating the reservation can include signaling the expansion for either a left side or a right side of the current spectrum. The modification on the current path can be on one of a left side or a right side of the current spectrum, and the updating the reservation can be on the other one of the left side or the right side such that the connection is retuned during reversion. Note, the optical spectrum can be the C-Band (about 1530 nm to 1565 nm), for example. By left side and right side, this means numerically on the spectrum graph. For example, assume a connection is at 1540-1542 nm, the left side would be 1540 nm and less and the right side would be 1542 nm and greater.

The modification on the current path can change current spectrum, and the same current spectrum is unavailable on the home path, and the service modification process 200 can further include re-signaling on the home path for different spectrum for the reservation such that the connection can retune during reversion (step 206). The modification on the current path can change current spectrum, and the same current spectrum or different can be unavailable on the home path to support the modification, and the service modification process 200 can further include raising an alarm and preventing reversion of the connection to the home path (step 207).

The connection can be an optical connection utilizing flexible grid spectrum, wherein the modification can include expansion of the flexible grid spectrum, wherein the connection utilizes at least one regenerator port on the home port, and wherein the reservation can include changing the at least one regenerator port. The modification can include changing service characteristics of the connection including one of restorability and service priority.

In another embodiment, the node 130 includes a plurality of ports (line module 134) communicatively coupled to a network 100; a switch (switch module 136) configured to switch data between the plurality of ports; and a controller 150 communicatively coupled to the plurality of ports and the switch and configured to implement a control plane 126 with other nodes in the network 130, wherein a connection is signaled by the controller 150 on a home path, wherein the connection is signaled off of the home path to a current path which is at least partly disjoint from the home path and a reservation is created by the controller 150 for the connection on the home path such that the connection can revert thereto, wherein the reservation is signaled to all nodes on the home path, wherein the controller 150 signals a modification of the connection while it is on the current path, and the controller 150 updates the reservation based on the modification.

In a further embodiment, a network 100 includes a plurality of nodes 130; a plurality of links 120 interconnecting the plurality of nodes 130; one or more controllers 150 implementing a control plane 126 for control of connections in the network 100; wherein a connection is signaled by on a home path, wherein the connection is signaled off of the home path to a current path which is at least partly disjoint from the home path and a reservation is created by the control plane for the connection on the home path such that the connection can revert thereto, wherein the reservation is signaled to all nodes 130 on the home path, wherein the control plane 126 signals a modification of the connection while it is on the current path, and the control plane 126 updates the reservation based on the modification.

Service Expansion on Protect Route and Spectrum Reservation

Figure 5:
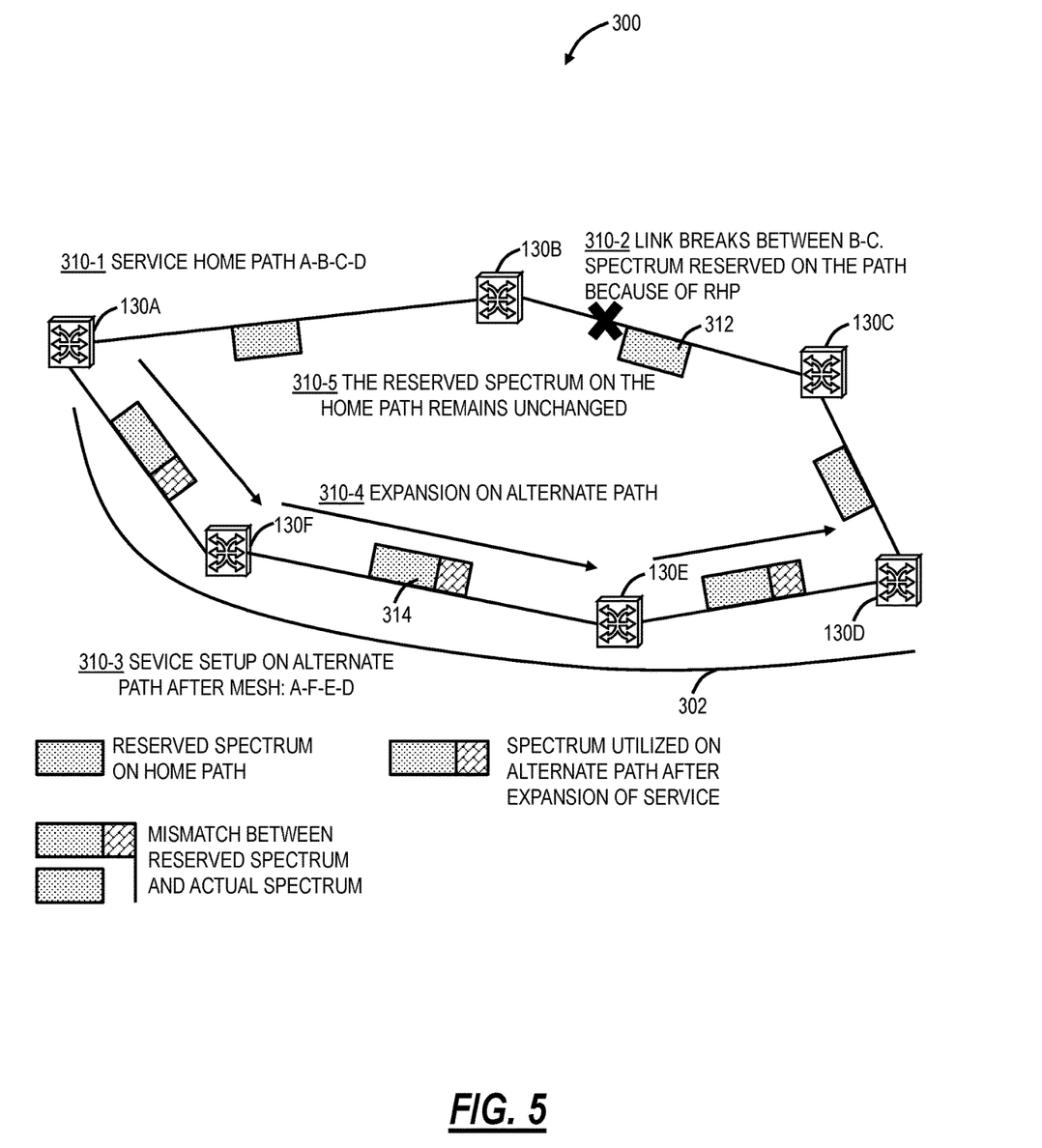
FIG. 5 is a network diagram of a network illustrating service expansion of optical spectrum while a connection is off of its home path.

FIG. 5 is a network diagram of a network 300 illustrating service expansion of optical spectrum while a connection 302 is off of its home path. The network 300 includes nodes 130A-130F. The home path for the connection 302 is nodes 130A, 130B, 130C, 130D (step 310-1). Assume there is a fault and the link 120 between nodes 130B, 130C (step 310-2). At this point, the connection 302 has then current reserved spectrum 312 (for illustration purposes, the current reserved spectrum 312 is illustrated as a rectangle). The control plane 126 performs mesh restoration and sets up the connection 302 on an alternate path (the now current path) via the nodes 130A, 130F, 130E, 130D (step 310-3). Note, there is a reservation 312 in the control plane 126 for the connection 302 on the home path while it is on the alternate path. At some point, the connection 302 is expanded while on the alternate path to expanded spectrum 314 (step 310-4). However, conventionally, the reservation on the home path remains unchanged (step 310-5) and there is a mismatch between the spectrum 312, 314 which would be problematic when the connection 302 reverts to the home path.

Figure 6:
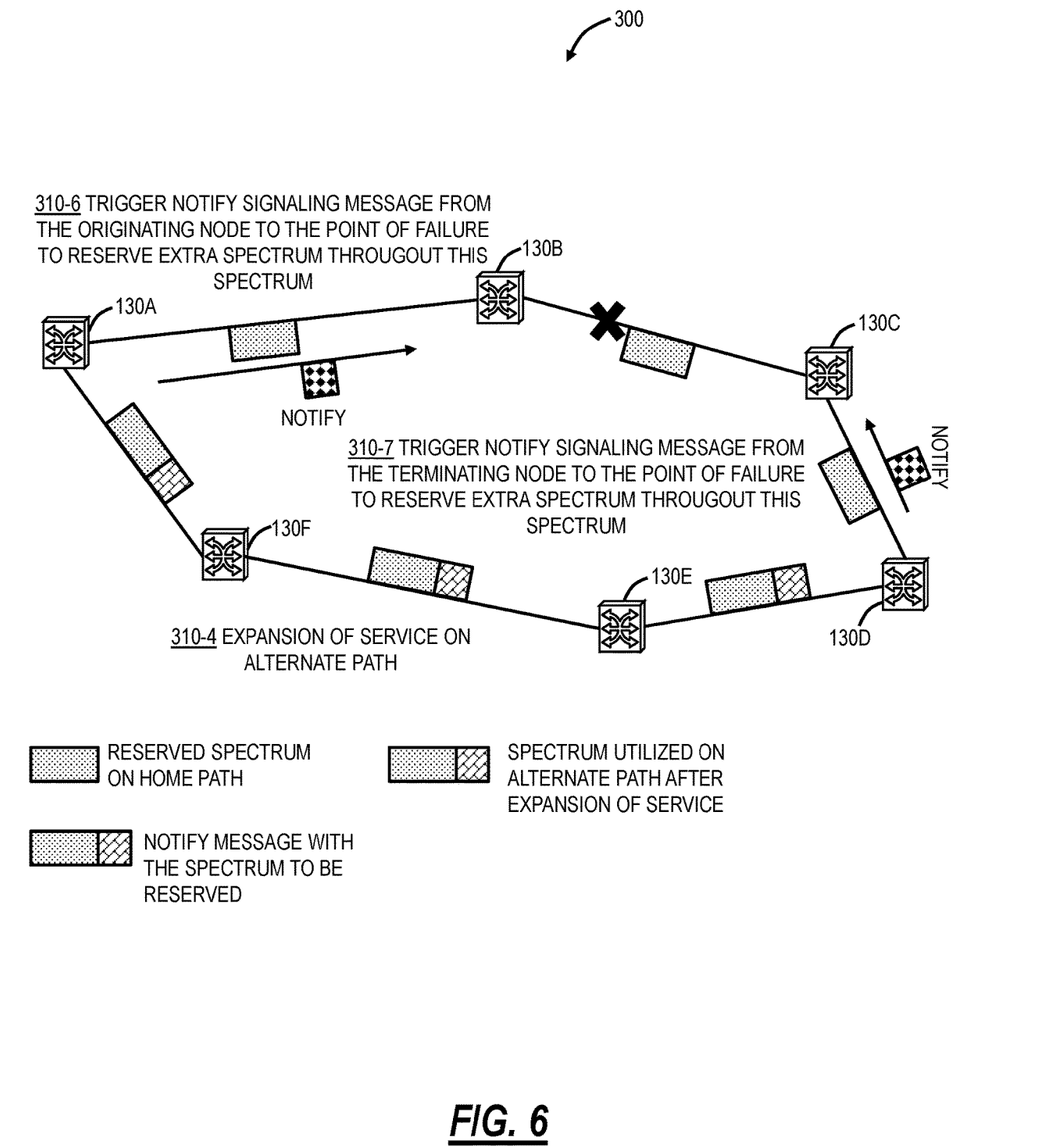
FIG. 6 is a network diagram of the network illustrating service expansion of optical spectrum while the connection is off of its home path and the implementation of the service modification process of FIG. 4.

FIG. 6 is a network diagram of the network 300 illustrating service expansion of optical spectrum while the connection 302 is off of its home path and the implementation of the service modification process 200. Here, the connection 302 is expanded while on the alternate path to expanded spectrum 314 (step 310-4). With the service modification process 200, subsequent to the expansion, the node 130A triggers a Notify signaling message along the home path towards the point of failure to reserve the expanded spectrum 314 (step 310-6). In this example, the node 130A signals the node 130B. Also, the terminating node 130D triggers a notify signaling message along the home path towards the point of failure to reserve the expanded spectrum 314 (step 310-7). In this example, the node 130D signals the node 130C. As such, all nodes on the home path are reached. That is, when there is a break, the signaling must be from both the originating node 130A (source node) and the terminating node 130D (destination node).

During expansion on the alternate (protect) route, spectrum availability can be validated for expansion on the home path. Preference can be given to allocate spectrum on either the left/right side of the allocated spectrum so as to avoid retuning services on reversion. The additional spectrum required is validated on the home path from the head and tail end.

If the spectrum is available, a signaling protocol Notify message can be signaled from the head node 130A which will resize the spectrum throughout the home path up to the broken link. In a similar way, the signaling protocol Notify can be signaled from the tail node 130D in the reverse direction which will resize the spectrum throughout the home path up to the broken link.

If the spectrum is not available for expansion on either left or right of the current spectrum, the required spectrum can be validated on the home route and complete retune of the expanded spectrum can be considered if it is available elsewhere on the home path. However, when the home path cannot resize due to spectrum unavailability, an alarm can be raised on the service to not revert. A retry mechanism can be used where a periodic check for spectrum availability is retried.

Figure 7:
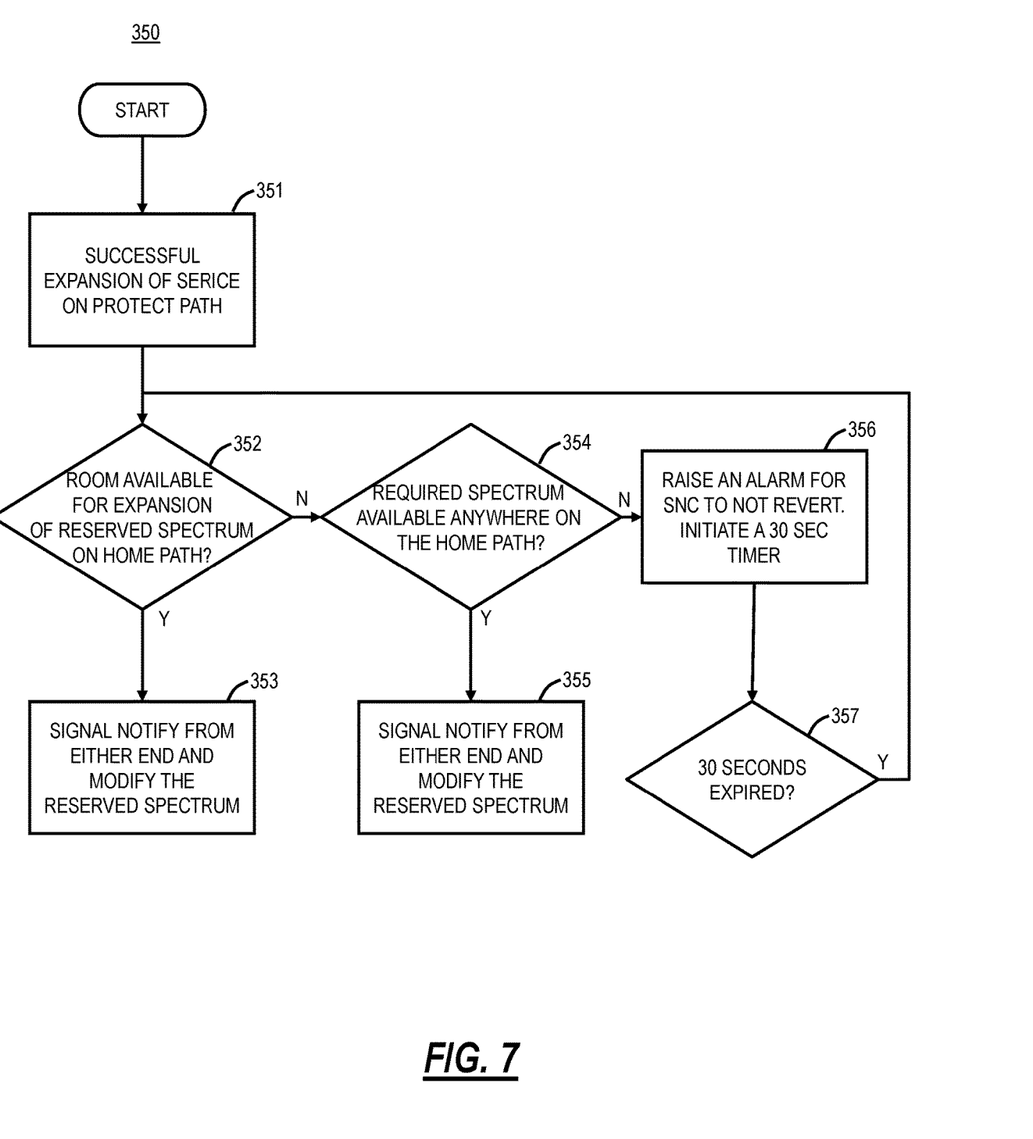
FIG. 7 is a flowchart of a process of service expansion of optical spectrum.

FIG. 7 is a flowchart of a process 350 of service expansion of optical spectrum. There is a successful expansion of service on the protect path (step 351). Depending on whether there is spectrum available for expansion of reserved spectrum on the home path (step 352), a notify message or equivalent is signaled from each end of the home path to modify the reserved spectrum (step 353). If there is no room for expansion (step 352), the process 350 includes determining if the required bandwidth is available elsewhere in the spectrum on the home path (step 354), and if so, a Notify message or equivalent is signaled from either end of the home path to modify the reserved spectrum (step 355). If there is no spectrum available (step 354), an alarm is raised for the service to not revert and a timer is established (step 356) and the process 350 returns to step 352 after the expiration of the timer (step 357).

Service Expansion on Protect Route and Regen Banks Reservation

In the scenario where a service expands while on the alternate route and the home path was set up through a regenerator node, regenerator port availability can be validated on the home path. A signaling protocol Notify message can be signaled from both the ends of the home path which will occupy the regen port on the home path. In the case where regenerator ports are not available, an alarm on the service can be raised and the service is prevented from reverting during the alarm. A retry mechanism can be used where it will retry after every 30 seconds or so to check for spectrum availability.

Service Contraction on Protect Route

If the service contracts on the protect route, the same principles can be applied. This will free up the relinquished spectrum on the home route which will then be available for use by other services.

Service Parameters Edit on Protect Route

If the any of the service level parameters are modified (e.g., priority), a notify message can be signaled from both the ends of the home path which will modify the home route service parameters.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A service modification method comprising:
in a node which is part of a network controlled by a control plane, routing a connection off of its home path to a current path which is at least partially disjoint from the home path and creating a reservation for the connection on the home path such that the connection can revert thereto;
signaling a modification of the connection while it is on the current path; and
updating the reservation based on the modification comprising signaling the modification to all nodes on the home path.

2. The service modification method of claim 1, further comprising:
reverting the connection to the home path with the modification.

3. The service modification method of claim 1, wherein the updating fails due to an inability to support the modification on the home path, and further comprising:
periodically retrying the updating the reservation based on the modification.

4. The service modification method of claim 1, wherein the connection is an optical connection utilizing flexible grid spectrum, and the modification comprises expansion or contraction of the flexible grid spectrum.

5. The service modification method of claim 4, wherein the updating the reservation comprises signaling the expansion for either a left side or a right side of current spectrum.

6. The service modification method of claim 4, wherein the modification on the current path is on one of a left side or a right side of current spectrum, and the updating the reservation is on the other one of the left side or the right side of the home path spectrum such that the connection can retune during reversion.

7. The service modification method of claim 4, wherein the modification on the current path changes current spectrum, and the current spectrum is unavailable on the home path, and further comprising:
re-signaling on the home path for different spectrum for the reservation such that the connection is retuned during reversion.

8. The service modification method of claim 4, wherein the modification on the current path changes current spectrum, and the current spectrum or different is unavailable on the home path to support the modification, and further comprising:
raising an alarm and preventing reversion of the connection to the home path.

9. The service modification method of claim 1, wherein the connection is an optical connection utilizing flexible grid spectrum, wherein the modification comprises expansion of the flexible grid spectrum, wherein the connection utilizes at least one regenerator port on the home port, and wherein the updating the reservation comprises changing the at least one regenerator port.

10. The service modification method of claim 1, wherein the modification comprises changing service characteristics of the connection comprising one of restorability and service priority.

11. A node comprising:
a plurality of ports communicatively coupled to a network;
a switch configured to switch data between the plurality of ports; and
a controller communicatively coupled to the plurality of ports and the switch and configured to implement a control plane with other nodes in the network,
wherein a connection is signaled by the controller on a home path, wherein the connection is signaled off of the home path to a current path which is at least partially disjoint from the home path and a reservation is created by the controller for the connection on the home path such that the connection can revert thereto, wherein the reservation is signaled to all nodes on the home path,
wherein the controller signals a modification of the connection while it is on the current path, and the controller updates the reservation based on the modification.

12. The node of claim 11, wherein the controller reverts the connection to the home path with the modification.

13. The node of claim 11, wherein the updated reservation fails due to an inability to support the modification on the home path, and wherein the controller periodically retries to update the reservation based on the modification.

14. The node of claim 11, wherein the connection is an optical connection utilizing flexible grid spectrum, and the modification comprises expansion or contraction of the flexible grid spectrum.

15. The node of claim 11, wherein the modification comprises changing service characteristics of the connection comprising one of restorability and service priority.

16. A network comprising:
a plurality of nodes;
a plurality of links interconnecting the plurality of nodes; and
one or more controllers implementing a control plane for control of connections in the network;
wherein a connection is signaled by on a home path, wherein the connection is signaled off of the home path to a current path which is at least partially disjoint from the home path and a reservation is created by the control plane for the connection on the home path such that the connection can revert thereto, wherein the reservation is signaled to all nodes on the home path,
wherein the control plane signals a modification of the connection while it is on the current path, and the control plane updates the reservation based on the modification.

17. The network of claim 16, wherein the control plane reverts the connection to the home path with the modification.

18. The network of claim 16, wherein the updated reservation fails due to an inability to support the modification on the home path, and wherein the controller periodically retries to update the reservation based on the modification.

19. The network of claim 16, wherein the connection is an optical connection utilizing flexible grid spectrum, and the modification comprises expansion or contraction of the flexible grid spectrum.

20. The network of claim 16, wherein the modification comprises changing service characteristics of the connection comprising one of restorability and service priority.

* * * * *